April 14, 1970     T. G. CROMBIE     3,506,129

PERFORATED STEEL BELT CONVEYOR

Filed May 3, 1968

INVENTOR.
Terence G. Crombie
BY
*Curtis, Morris & Safford*
ATTORNEYS 3,506,129
PERFORATED STEEL BELT CONVEYOR
Terence G. Crombie, 1773 California St.,
Rolling Meadows, Ill. 60008
Filed May 3, 1968, Ser. No. 726,322
Int. Cl. B01d 33/36
U.S. Cl. 210—401                                    11 Claims

ABSTRACT OF THE DISCLOSURE

A perforated steel belt conveyor is disclosed. The perforations are small so that the belt can support the solids upon the top surface. Each of the perforations is frusto-conical with a small entry opening at the top surface of the belt and flaring side walls so that any particle entering the perforation will pass through it. The edges and transverse strips of the belt are unperforated so as to provide a satisfactory support for the perforated portions.

---

This invention relates to the separation of solids from liquids and more in particular to an endless belt sieve or the like where liquid containing solids is delivered to the top surface of the belt and passes through perforations in the belt as the belt moves at a small upward incline to the horizontal and the solids remain on the belt surface.

An object of this invention is to provide an improved endless belt type of liquid-solid separator. A further object is to provide an efficient and dependable system for separating the liquids from solids in a continuous manner. A further object is to provide for the above in a manner which avoids the difficulties which have been encountered with similar prior arrangements. A further object is to provide an improved perforated belt construction. A further object is to provide for the above with structure which is adaptable to various uses and conditions of operation. These and other objects will be in part obvious and in part pointed out below.

Figure 1:
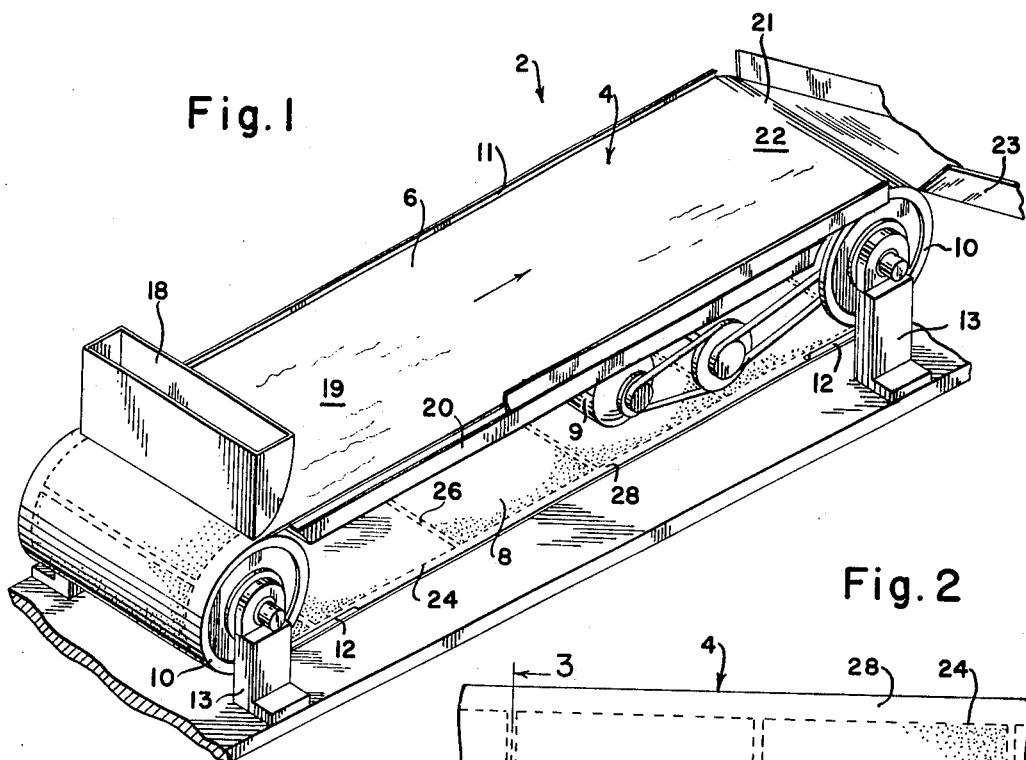
FIGURE 1 is a somewhat schematic perspective view of one embodiment of the invention.
Figures 3, 4:
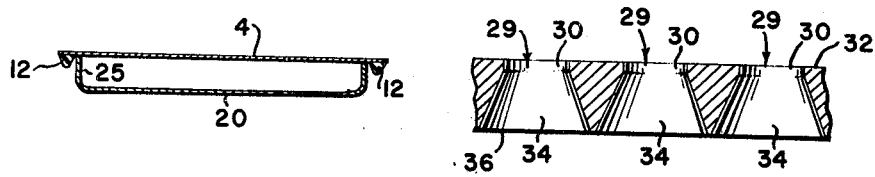
FIGURE 3 is a section view on the line 3—3 of FIGURE 2.
FIGURE 4 is a greatly enlarged cross section on the lines 4—4 of FIGURE 2.

Referring to FIGURE 1 of the drawings, a continuous liquid-solids separating unit 2 is shown having an endless belt 4 with a top run 6 which moves to the right at a slight upward incline, and a bottom run 8 parallel thereto. At each end of the runs there is a pair of sheaves 10 mounted upon a horizontal shaft in the general manner of the conveyor shown in U.S. Patent No. 2,855,093. Two V-belts 12 (see also FIGURE 3) are secured to the opposite edges of belt 4, which ride in sheaves 10. The conveyor is driven at the right by an electric motor 9. As shown at the left in FIGURE 1, a feed unit 18 deposits a flat stream 19 of a product comprising liquid and solids onto the belt, and the flow rate is regulated so that it does not overflow stationary dams 11 along the sides of the top run 6. As the product is carried to the right on the belt, the liquid passes through the perforations in belt 4, and the liquid is collected in a collecting tray 20 (see also FIGURE 3) beneath the upper run of the belt and the solids form a product layer 22 which does not contain free liquid when it reaches the right-hand end 21 of top run 6. At the right-hand end 21 the product layer 22 tends to move outwardly and the belt peels from it downwardly around the right-hand sheave 10. The product 22 is discharged through a chute 23 and the belt continues around the sheave and back along the bottom run 8. As shown in FIGURE 3, the belt rests upon the side walls 25 of tray 20 so as to provide support for the belt and also hold the liquid within the tray.

Figure 2:
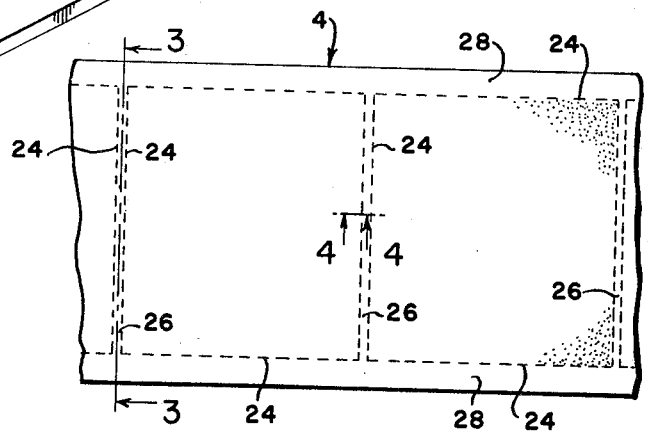
FIGURE 2 is a top plan view on a larger scale of a portion of the endless belt of FIGURE 1.

Referring to FIGURE 2, the perforations in belt 4 are in rectangular patterns which are outlined schematically in broken lines at 24. Each rectangular pattern is separated from the next by an imperforate strip 28. Hence, each of the V-belts 12 is bonded to an imperforate side strip of the belt and those side strips are interconnected by the imperforate cross strips 26. Therefore, each rectangular pattern of perforations is surrounded by an imperforate frame, and it is supported adjacent the sides of the belt by the continuous imperforate strips 28. Also, the V-belts provide a certain amount of reinforcement for the imperforate strips.

The perforations in the belt are shown on a greatly enlarged scale in FIGURE 4. Each perforation 29 has a relatively small liquid inlet opening 30 at the top surface 32 of the belt and has substantially frusto-conical walls extending from opening 30 to a greatly enlarged outlet opening 32 on the bottom belt surface 36. With this construction, the openings constitute a fairly small portion of the total top surface of the belt so that the product is supported quite adequately. The perforations are of the size that the openings 30 are bridged by the product, and in a sense the product acts as its own filter in permitting the liquid to seep into the openings and drain down and through the perforations 29. However, the downwardly flaring side walls of the perforations prevent the solids in the product from clogging an opening, even if some solid particles should pass through the opening 30.

Perforations 29 are formed by etching, and very satisfactory results have been obtained by a known process wherein the etching pattern is produced somewhat in the manner in which a photographic negative is produced. The belt is properly prepared and is then coated throughout with a light-sensitive coating. Two transparent flat templets are then positioned against the opposite surfaces 32 and 36 of the belt. Each of the templets bears a pattern of dots which are identical with the perforation pattern which is to be produced in the belt. The dots on the templet positioned against surface 32 are substantially of the size of openings 30, and the dots on the templet positioned against surface 36 are substantially of the size of openings 34. Each dot on each templet is in exact alignment with a dot on the other templet. Light is then projected onto the areas of the belt covered by the templets so as to "expose" the light-sensitive coating, except beneath the dots. The coating is then "developed" so as to harden the sensitized light coating, and the unexposed dots of the coating are washed away. The belt is then subjected to an etching solution which etches away the belt within the areas where the dots of the coating have been removed and the metal is exposed. The etching proceeds and produces the frusto-conical shaped perforations 29 as represented in FIGURE 4. The perforations are non-clogging in that the diameter increases in the direction in which the liquid flows.

This belt construction provides very satisfactory support for the product throughout the rectangular perforated areas. The substantially large amount of metal adjacent the top surface 32 provides the desired strength to insure against undesirable distortion or sagging. The overall arrangement of the rectangular perforated belt portions and the longitudinal imperforate cross strips is used advantageously in combination with the V-belt and the sheaves. Throughout the top run 6 the belt is under sufficient tension to maintain the straight contour, but it is also supported at its edges to provide continuous support throughout the zone where the product is carried. At the ends of the runs the belt is supported around the sheaves and the belt acts to maintain the true substantially semi-cylindrical contour. The imperforate strips of the belt cooperate to insure that each of the rectangular perforated area will be supported when passing around the sheaves without undue strain to the perforated areas. The use of the two V-belts and the sheaves at the edges of the belt also makes it unnecessary to be concerned about product particles which may be in the perforations or on the bottom side of the belt at the end 21 of the top run. If the belt were to pass over a solid drum any such particles would tend to be squeezed and pushed into the perforations, thus causing a serious clogging problem. However, with the construction of the present invention any such particles remain undisturbed and the perforations are constantly cleaned out by liquid draining through them.

The illustrative embodiment of the invention is a commercially satisfactory system for separating the liquid from the solids in a fairly thick or viscous flowable product. Belt 4 is 24 inches wide and each of the imperforate side strips 28 is two inches wide, leaving 20 inches as the transverse dimension of the perforated areas. Those areas are 19 inches in the other dimension and the imperforate cross strips are ½ inch wide. Belt 4 is made of steel having a thickness of .024 inch. Each perforation 29 is .026 inch in diameter at its opening 30. The perforations are in rows with their centers spaced .042 inch apart, and the holes in the adjacent rows are staggered. Hence along each row in each direction the center of each hole is spaced .042 inch from each adjacent hole.

It is understood that these specific dimensions are of the illustrative embodiment of the invention. The size and spacing of the holes and belt thickness, and the other characteristics of the belt are determined in accordance with the particular product with respect to which the belt is to be used, and the various other factors relating to the design and the mode of operation desired. The belt is of such thickness as to provide adequate support for the product, and the length of the top run 6 is that required to permit the liquid to pass from the solids. It has been indicated above that the top run 6 of the belt is supported by the side walls of tray 20. Those side walls engage the imperforate side strips 28 of the belt so that all of the liquid passes through the belt between the side walls. The upward incline of the belt promotes the draining of the liquid from the product and it also helps in insuring that the liquid will fall into tray 20 rather than remain as a surface layer on the belt.

It has been indicated above that the drawings are somewhat schematic and it is understood that the standard auxiliaries and components will be used in the actual construction.

What is claimed is:

1. In apparatus for separating liquid from solids, an endless sheet belt having spaced perforated areas with imperforate side strip portions along its opposite edges, said belt having an imperforate cross strip portion separating each of said perforated areas from the next, each of said perforated areas having therein a plurality of perforations each of which is substantially frusto-conical with increasing diameter from one surface of the belt, which is the top surface which supports the product, and a pair of supporting belts attached respectively to said imperforate side strip portions.

2. Apparatus as described in claim 1 which includes, two pairs of sheaves mounting said belt to form an upper run and a lower run, one of said pairs being at each end of said runs and mating with said supporting belts.

3. Apparatus as described in claim 2 wherein said sheaves support said belt with the upper run having a longitudinal upward incline, and a liquid-collecting tray positioned beneath said upper run and having side walls which engage and provide support for said upper run.

4. Apparatus as described in claim 2 wherein said endless belt is steel.

5. Apparatus as described in claim 3 which includes, means to deposit a product upon said belt at one end of said upper run, means at the other end thereof to receive the solids from said upper run, and means to drive said belt.

6. In apparatus of the character described, the combination of, a thin endless metal belt having an upper run and a lower run and presenting a product-supporting surface between the respective ends of said runs, said belt having perforations to provide for the passage of liquid from said product-supporting surface, said perforations being spaced from the side edges of said belt and each having a minimum diameter adjacent said product-supporting surface and being of increased diameter toward the opposite surface of the belt, and mounting means for said belt providing support at the edges thereof.

7. Apparatus as described in claim 6 wherein said mounting means supports said belt to position said product-supporting surface at an upward incline longitudinally of said upper run whereby the product is moved upwardly and horizontally.

8. Apparatus as described in claim 6 wherein said mounting means comprises two pairs of sheaves with said pairs being at the respective ends of said runs, and a pair of V-belts bonded to said metal belt and mating with said sheaves.

9. Apparatus as described in claim 6 wherein said mounting means comprises a pair of V-belts bonded to said opposite surface of the belt respectively adjacent said edges thereof, said perforations being in areas spaced serially along the belt with imperforate cross strips therebetween whereby each area of perforations is surrounded by two of said cross strips and oppositely disposed portions of the edge portions of the belt to which said V-belts are bonded.

10. Apparatus as described in claim 9 which includes two pairs of sheaves mounted respectively at the opposite ends of said runs and with the two sheaves of each pair mating respectively with said V-belts.

11. Apparatus as described in claim 9 wherein said perforations are substantially frusto-conical with the minimum diameter of each being of the order of .026 inch, and with the centers of perforations being spaced .042 inch apart, and wherein said belt is of steel having a thickness of the order of .024 inch.

References Cited

UNITED STATES PATENTS

| | | | |
|---|---|---|---|
| 2,929,507 | 3/1960 | Komline | 210—400 |
| 3,221,819 | 12/1965 | Dickinson et al. | 210—460 X |

REUBEN FRIEDMAN, Primary Examiner

T. A. GRANGER, Assistant Examiner